United States Patent [19]
Gooch et al.

[11] Patent Number: 5,830,590
[45] Date of Patent: *Nov. 3, 1998

[54] MAGNETIC STORAGE AND REPRODUCING SYSTEM WITH A LOW PERMEABILITY KEEPER AND A SELF-BIASED MAGNETORESISTIVE REPRODUCE HEAD

[75] Inventors: Beverley R. Gooch, Sunnyvale; Thomas M. Coughlin, Atascadero; David H. Davies, Cupertino, all of Calif.

[73] Assignee: Ampex Corporation, Redwood City, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 674,768

[22] Filed: Jun. 28, 1996

[51] Int. Cl.$^6$ ............................. G11B 5/66; G11B 5/70; G11B 5/02

[52] U.S. Cl. ......................... 428/694 TM; 428/694 T; 428/694 ST; 360/55; 360/66; 360/131; 336/213; 335/297; 148/304; 148/403

[58] Field of Search ................ 428/694 TM, 694 T, 428/694 ST; 360/55, 66, 131

[56] References Cited

U.S. PATENT DOCUMENTS

| | | |
|---|---|---|
| 3,079,468 | 2/1963 | Morey . |
| 3,084,227 | 4/1963 | Peters . |

(List continued on next page.)

FOREIGN PATENT DOCUMENTS

| | | |
|---|---|---|
| 71361/74 | 1/1976 | Australia . |
| 0472162A | 2/1992 | European Pat. Off. . |
| 3509020 | 9/1985 | Germany . |
| 53-65712 | of 1978 | Japan . |
| 818811 | 8/1959 | United Kingdom . |
| 822240 | 10/1959 | United Kingdom . |
| 844081 | 8/1960 | United Kingdom . |
| 2073472 | 10/1981 | United Kingdom . |
| WO87/03728 | 6/1987 | WIPO . |

OTHER PUBLICATIONS

Marvin Camras, Magnetic Recording Handbook, 1988.
James E. Opfer, Bruce F. Spenner, Bangalore R. Natarajan, Richard A. Baugh, Edward S. Murdock, Charles C. Morehouse and David J. Bromley, Thin–Film Memory Disc Development, 1985, pp. 4–10.
Eberhard Koste, Fernseh–Und Kino–Technik, 1984, pp. 425–432.
W. Earl Stewart, Magnetic Recording Techniques, 1958, pp. 87–104.
J. Flora and J.R. Werning, Multitrack Probe Type Recording Transducer, IBM Technical Disclosure Bulletin.
Otto Kornei, Survey of Flux–Responsive Magnetic Reproducing Heads, Journal of Audio Engineering Society, vol. 2, No. 3, Jul. 1954.

(List continued on next page.)

*Primary Examiner*—Daniel Zirker
*Attorney, Agent, or Firm*—John G. Mesaros; George B. Almeida

[57] ABSTRACT

A magnetic storage system includes a magnetic storage medium comprising a keeper layer of relatively low permeability soft magnetic material deposited upon a magnetic storage layer or between multiple magnetic storage layers. The low permeability keeper layer may be disposed either above or below the magnetic storage layer. In the unsaturated state, the keeper layer acts as a shunt path for flux emanating from recorded transitions on the magnetic storage layer, producing an image field of the recorded transitions in the keeper. This shunt path prevents signal flux emanating from the recorded transitions from reaching the head. To read data from a recorded transition on the magnetic storage layer, a bias current is applied to windings of the head, creating a bias flux which saturates a portion of the keeper layer. Once saturated, this portion of the keeper can no longer shunt flux emanating from the recorded transition, which is the region represented by the head reproduce transducer.

11 Claims, 12 Drawing Sheets

U.S. PATENT DOCUMENTS

| | | |
|---|---|---|
| 3,106,614 | 10/1963 | Fox . |
| 3,127,592 | 3/1964 | Neergaard . |
| 3,188,399 | 6/1965 | Eldridge . |
| 3,239,823 | 3/1966 | Chang . |
| 3,255,307 | 6/1966 | Schuller . |
| 3,314,056 | 4/1967 | Lawrance . |
| 3,391,254 | 7/1968 | Honig . |
| 3,432,837 | 3/1969 | Fan . |
| 3,435,440 | 3/1969 | Nallin . |
| 3,555,204 | 1/1971 | Braun . |
| 4,277,809 | 7/1981 | Fisher et al. . |
| 4,318,136 | 3/1982 | Jeffers . |
| 4,410,603 | 10/1983 | Yamamori et al. . |
| 4,464,691 | 8/1984 | Sawazaki . |
| 4,530,016 | 7/1985 | Sawazaki . |
| 4,535,369 | 8/1985 | Sawazaki . |
| 4,613,915 | 9/1986 | Crouse et al. . |
| 4,642,709 | 2/1987 | Vinal . |
| 4,657,812 | 4/1987 | Hatanai et al. . |
| 4,657,819 | 4/1987 | Funaki . |
| 4,687,712 | 8/1987 | Sugita et al. . |
| 4,698,711 | 10/1987 | Vinal . |
| 4,717,592 | 1/1988 | Nagao et al. . |
| 4,782,415 | 11/1988 | Vinal . |
| 4,985,795 | 1/1991 | Gooch . |
| 5,041,922 | 8/1991 | Wood et al. . |
| 5,062,007 | 10/1991 | Nakatsu et al. . |
| 5,105,323 | 4/1992 | Ruigrok . |
| 5,119,255 | 6/1992 | Gooch . |
| 5,130,876 | 7/1992 | Gooch . |
| 5,132,957 | 7/1992 | Mashimo . |
| 5,147,732 | 9/1992 | Shiroishi et al. . |
| 5,153,796 | 10/1992 | Gooch ..................................... 360/115 |
| 5,176,965 | 1/1993 | Mallary . |
| 5,189,572 | 2/1993 | Gooch . |
| 5,216,657 | 6/1993 | Nishiuchi et al. . |
| 5,227,939 | 7/1993 | Gooch . |
| 5,243,588 | 9/1993 | Maeda et al. . |
| 5,331,492 | 7/1994 | Komai et al. . |
| 5,337,203 | 8/1994 | Kitada et al. . |
| 5,431,969 | 7/1995 | Mallary . |
| 5,432,012 | 7/1995 | Lal et al. ..................... 428/694 TM X |
| 5,483,403 | 1/1996 | Voegeli . |
| 5,493,464 | 2/1996 | Koshikawa . |
| 5,514,452 | 5/1996 | Araki et al. . |

OTHER PUBLICATIONS

Dirk Quak, Influence of the Layer of Thickness of a Double-–Layer Medium on the Reproduced Signal in Perpendicular Recording, IEEE Transactions On Magentics, vol. Mag–19, No. 4, Jul. 1983.

Shun–ichi Iwasaki, Perpendicular Magnetic Recording, IEEE Transactions on Magnetics, vol. MAG–16, No. 1, Jan. 1980.

Shun–ichi Iwasaki, Yoshihisa Nakamura and Isao Watanabe, Perpendicular Recording/Playback on Composite Film Media No. 37, Research Institute, Electro–communication, Tohoku University, Memo for the 1979 Electro–communication Society (Semiconductor and Material Department) Meeting No. 191.

Shun–ichi Iwasaki, Kazuhiro Ohuchi and Naoki Honda, "Anisotropy and Film Structure of Perpendicular Recording Medicum" No. 38, Research Institute, Electro–communication, Tohoku University, Memo for the 1979 Electro–communication Society (Semiconductor and Material Department) Meeting No. S2–5.

Shun–ichi Iwasaki and Yoshihisa Nakamura, "One Method for Magnetic Recording Using Composite Recording Medium" No. 46, Memo for the 1979 Electro–communication Society Meeting No. 241.

Shun–ichi Iwasaki, Yoshihisa Nakamura and Masaki Watanabe, Relationship between Recording Sensitivity and Reproducing Sensitivity in Perpendicular Recording, No. 48, Memo for the 1979 Tohoku–area Electronic Related Society Meeting No. 1F2.

Shun–ichi Iwasaki, Kazuhiro Ohuchi and Naoki Honda, Magnetic Behaviors of Composite Film Medium in Perpendicular Recording No. 39, Research Institute, Electro–communication, Tohoku University, Abstracts of the 3rd Annual Conference on Magnetics in Japan, 1979 (24pA–6)

Shun–ichi Iwasaki, Yoshihisa Nakamura, Isao Watanabe and Masaki Watanabe, "High Density Recording and Reproducing with Perpendicular Magnetic Head" No. 40, Research Institute, Electro–communication, Tohoku University, Abstract of the 3rd Annual Conference on Magnetics in Japan, 1979 (24pA–14).

Shun–ichi Iwasaki, Yoshihisa Nakamura and Makoto Koizumi, "Experiments of Perpendicular Magnetic Recording with Magnified Head and Medium" No. 41, Research Institute, Electro–communication, Tohoku University, Abstract of the 3rd Annual Conference on Magnetics in Japan, 1979 (24pA–13).

IEEE Transactions on Magnetics, "A Yoke Magnetoresistive Head for High Track Density Recording", Maruyama et al., vol. Mag–23, No. 5, Sep. 1987, p. 2503–2505.

IEEE Transactions on Magnetics, "Effect of Induced Uniaxial Magnetic Anisotropy of Ni–Fe Keeper Layer on the Recording Properties of Longitudinal Co–Cr–Ta/Cr Thin Film Media", Sin et al., vol. 31, No. 6, Nov. 1995.

IEEE Transaction on Magnetics, "A High Resolution Flying Magnetic Disk Recording System with Zero Reproduce Spacing Loss", Gooch et al., vol. 27, No. 6, Nov. 1991, pp. 4549–4554.

IEEE Transactions on Magnetics, "New Concepts for Perpendicular Magnetic Recording Hard Disk System", Nakamura et al., vol. 27, No. 6, Nov. 1991, pp. 4555–4560.

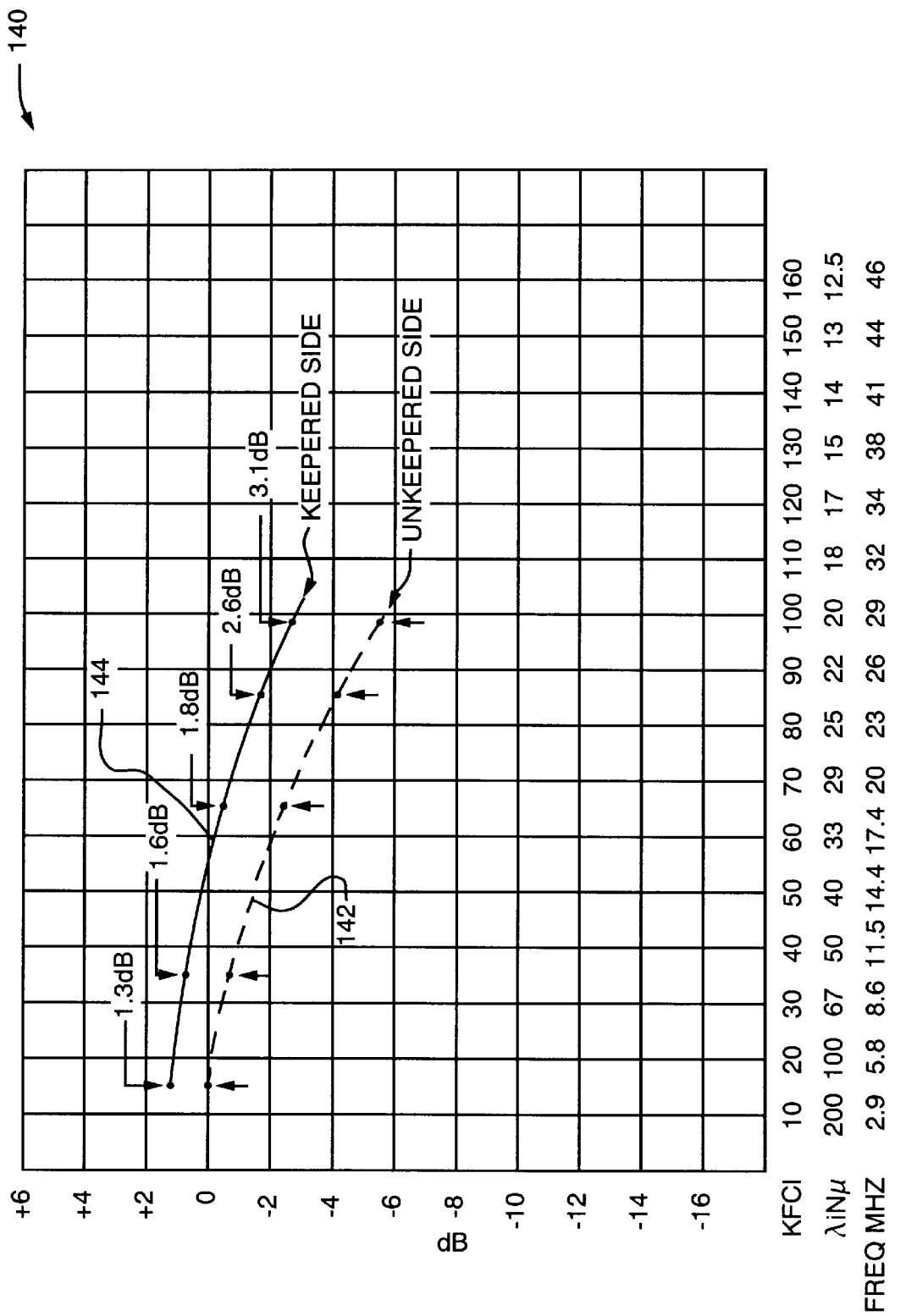

MAGNETIC STORAGE AND REPRODUCING SYSTEM WITH A LOW PERMEABILITY KEEPER AND A SELF-BIASED MAGNETORESISTIVE REPRODUCE HEAD

CROSS REFERENCE TO RELATED APPLICATIONS

This application contains subject matter related to the following commonly assigned, U.S. patent application: Ser. No. 08/575,203 filed Dec. 20, 1995, designated attorney docket number AMP-3856, entitled "Improved Magnetic Recording System Having a Saturable Layer and Detection Using MR Element" now abandoned.

1. Technical Field

The present invention relates to magnetic recording and reproducing systems, and in particular to a magnetic recording and reproducing system having a magnetic storage medium which includes a magnetic storage layer and an associated relatively low permeability keeper layer, which operates in cooperation with a magnetoresistive (MR) reproduce head.

2. Background of the Invention

In conventional wideband, high density magnetic signal processing, magnetic flux transferred to or from a magnetic storage medium permeates a magnetic core of a magnetic transducer (i.e., a head). During reproduction operation modes this flux produces an induced output voltage which, after suitable amplification, is a reproduced representation of the magnetic flux from the media that permeates the core and is suitable for use by a utilization device. During record operation modes, the permeating flux results from current applied to the transducer coil winding, and the flux fringes from a physical gap provided in the core for recording a representative signal in the magnetic storage medium.

One problem with prior art magnetic storage systems is that various losses occur during signal transfers between the magnetic storage medium and the transducer. One of the more significant losses, called "spacing loss", results from the physical spacing between the magnetic storage medium and the transducer. Spacing loss is particularly deleterious during reproduction operations where the effects of such loss are more significant. Prior efforts to reduce spacing loss primarily involved reducing the physical spacing by placing the transducer as close to the magnetic storage medium surface as operating conditions permitted. Such positioning, however, is accompanied by an increase in the likelihood of collisions between the transducer and magnetic storage medium, particularly in devices in which the transducer is normally supported above and out of contact with the storage medium surface, i.e., the transducer "flies" relative to the storage medium. On the other hand, if the transducer is in physical contact with the medium, damaging wear occurs due to the contact. However, it should be noted that if contact heads are used, the head is still separated from the storage medium by the carbon overcoat that is standard in such disks.

In addition to spacing loss, signal quality is also adversely affected by poor efficiency in signal transfer to and from the transducer. Reproduce gap loss is an example of one of the causes of poor efficiency. Reproduce gap loss is caused by the finite length of the physical gap within the transducer that is responsible for effecting signal transfers between the transducer and medium, and is manifested by a loss of output signal at shorter wavelengths. Reproduce gap loss is generally considered to be an inherent result of transducer geometry.

U.S. Pat. No. 5,041,922 to Wood et al (hereinafter "Wood et al."), assigned to the assignee of the present invention, discloses a magnetic recording system which includes a magnetic medium having an overlying or underlying "keeper" layer of magnetically saturable high permeability material. As disclosed in Wood et al., the properties of the keeper layer are selected to act as an extension of the head poles, thereby effectively bringing the head closer to the magnetic medium and reducing the spacing loss. Since one of the material properties of the head poles is high permeability, the keeper layer material in Wood et al was also selected to have high permeability. Since permeability of a material is generally a function of its thickness in thin film devices, if high permeability is to be attained, it requires a relatively thick keeper layer.

Use of a thick keeper layer may increase record losses. In general, the record losses increase as the thickness of the magnetically saturable layer overlying the medium increases. This is primarily because of attenuation of the write flux from the transducer, since it has to penetrate the overlying keeper layer in order to reach the magnetic storage layer in which data is being recorded. Therefore, although the high permeability keeper layer disclosed in Wood et al improves the system signal-to-noise ratio during reproduce operations, it may increase record losses due to the keeper layer thickness required to achieve high permeability, and thereby reduce the net gains.

Additional problems with prior art magnetic storage systems result from their widespread use of inductive heads (ferrite or thin film). As densities of disks increase, the number of coils (i.e., turns) in the head must also be increased in order to detect the weaker flux signals associated with the transitions of the denser disk. However, this increases the inductance of the head to an unacceptable level which may create a system resonance with the capacitance of the reproduce amplifier, and thus interfere with the reproduction of data stored on the magnetic storage medium.

Increased head inductance also creates problems during the write cycle. The larger the inductance of the head, the more time it takes for current to build up through the winding before sufficient flux is available at the tip region to write to the disk. Hence, a designer has to select a write speed sufficiently slow to ensure that the disk operates within acceptable criteria, or the designer has to provide a larger drive circuit to drive the head hard enough (i.e., increase the applied voltage) to overcome the high inductance.

A further problem with inductive heads is that as the density of the magnetic storage medium increases, the noise created by the head also increases. This, in turn, decreases the system signal to noise performance that can be attained from a magnetic storage system employing an inductive head, and eventually limits the recording density.

Hence, there is a need for a magnetic storage medium and system with improved storage capacity. In addition, there is a need for a magnetic storage system with an improved system signal to noise ratio during record mode operations, that also reduces record losses.

SUMMARY OF THE INVENTION

Accordingly, it is an object of the present invention to provide a magnetic storage and reproducing system with an improved storage density through improved system signal-to-noise ratio and reduced intersymbol interference.

Another object of the invention is to provide a magnetic storage and reproducing system with reduced spacing losses.

A further object of the present invention is to provide a magnetic storage and reproducing system with reduced record losses and improved reproduce signal gain.

According to the present invention, a magnetic storage system includes a magnetic storage medium comprising a keeper layer of relatively low permeability, soft magnetic, saturable material disposed upon a magnetic storage layer. The low permeability material may be disposed either above or below the magnetic storage layer, and still function in the intended fashion. In addition, a non-magnetic or "break" layer may be used between the keeper and the storage layer to reduce the exchange coupling between these layers.

When operating in an unsaturated state, the low permeability soft magnetic material acts as a shunt path for flux emanating from recorded transitions on the magnetic storage layer, thereby producing an image field of the recorded transitions in the relatively soft magnetic material which has the effect of reducing the demagnetization, and thus reducing the recorded transition length. This shunt path substantially reduces the flux levels emanating from the recorded transitions and reaching a transducer head of the system. The shunt path also increases the stability of the recorded transitions with respect to thermal demagnetization.

Consequently, to read data from a recorded transition on the magnetic storage layer, a saturating bias current is applied to windings of the head, creating a bias flux of sufficient strength and direction so as to saturate a portion of the soft magnetic material proximate that transition. While saturated or driven close to saturation, this portion of the soft magnetic material can no longer shunt flux emanating from the recorded transition. This allows substantially all of the flux from the recorded transition to couple to the head.

Specifically, the low permeability soft magnetic material provides a narrower reproduced pulse, compared to non-keepered media, by increasing the slope of the flux gradient across the recorded transitions on the magnetic storage layer. Advantageously, this increases the output voltage induced in the head during reproduce mode, since the induced head voltage is a function of the magnitude of the remnant magnetization from the recorded transitions, and the slope of the flux gradient (i.e., rate of the magnetization change) across the recorded transitions. In addition, the narrower reproduced pulses reduce intersymbol interference and allow greater recording density.

The soft magnetic layer is referred to as a "keeper layer" in the same sense as that term is used in Wood et al, since in its unbiased state, the keeper shunts substantially all the flux from recorded transitions on the magnetic storage layer, thus reducing the fields fringing from that storage layer. Data representative of those recorded transitions can only be reproduced when the bias flux is applied to saturate the associated portions of the keeper layer and, thereby, terminate the shunt. The shunting of flux by the keeper also impacts the side fringing fields and the effective track width. This, in turn, is a factor in obtaining higher track density in the recording system.

In an illustrative embodiment, the keeper layer is formed of a relatively thin layer of a soft magnetic material having a relatively high coercivity and low permeability, which saturates at a relatively low bias flux level, but cannot be saturated by flux from the magnetic storage layer alone. In general, the soft magnetic material may be any permeable alloy, and suitable materials include permalloy, sendust and super sendust.

Preferably, the permeability of the keeper layer is sufficient to provide a suitable shunt (or imaging) of the recorded transitions when the head is not applying a bias flux. For example, a permeability as low as seven (7) may provide a suitable shunt effect (note, the permeability of air is one). The keeper layer then can be made relatively thin, thus reducing the record losses.

An advantage of the present invention is that it allows an increase in recording density due to the improved system signal to noise ratio and reduced intersymbol interference. This reduced intersymbol interference is a result of the reduced recorded transition length and the narrowing of the flux through the saturated region of the keeper layer.

According to another aspect of the invention, saturation of the keeper layer is effected in a manner that allows flux from only one recorded transition to couple to the head during a read operation. Therefore, substantially all the flux from the adjacent recorded transitions is shunted by the unsaturated portions of the keeper layer. This reduces the intersymbol interference from recorded transitions other than the one being read and increases the data capacity of keepered versus non-keepered media.

A further advantage of the present invention is that it is independent of the type of head transducer employed in the magnetic storage system. For example, the present invention may operate with ferrite, thin-film inductive or magnetoresistive (MR) heads. Operation of the keeper layer as a magnetic shunt is not dependent upon matching the permeability of the keeper layer to the permeability of the head poles.

When operating in cooperation with the magnetic storage medium employing the low permeability keeper layer, the MR head provides improved intersymbol interference and improved system signal-to-noise ratio, and thus facilities denser storage media. Specifically, the transducer head may be a conventional MR head, or a modified MR head.

A conventional MR head comprises a separate inductive write element and an MR sensing element and an adjacent bias element (e.g., an external magnetic, a hard or soft layer or a current carrying conductor) which biases the sensing element such that the MR element operates in its linear sensing region. The bias element also saturates a portion of the keeper layer through which flux passes to the head during read operations. The head may also be disposed between high permeability shields to attenuate any side fringing fields which permeate the MR element.

The present invention may also employ a modified MR head which includes an MR element for real operations which is magnetically coupled to an inductive element which is used for write operations. In these embodiments, conductors disposed about the inductive head may be used to apply the bias flux to the keeper layer during read operations.

The magnetic storage medium is independent of the type of head transducer employed in the magnetic storage system. For example, the present invention may operate with ferrite, thin-film or magnetoresistive heads, including giant MR heads.

These and other objects, features and advantages of the present invention will become more apparent in light of the following detailed description of preferred embodiments thereof, as illustrated in the accompanying drawings.

BRIEF DESCRIPTION OF THE DRAWINGS

FIG. 5 a plot of test data comparing the gain for a conventional disk drive system without a keeper layer, and a disk drive system with a low permeability keeper layer;

DESCRIPTION OF A PREFERRED EMBODIMENT

Figure 1:
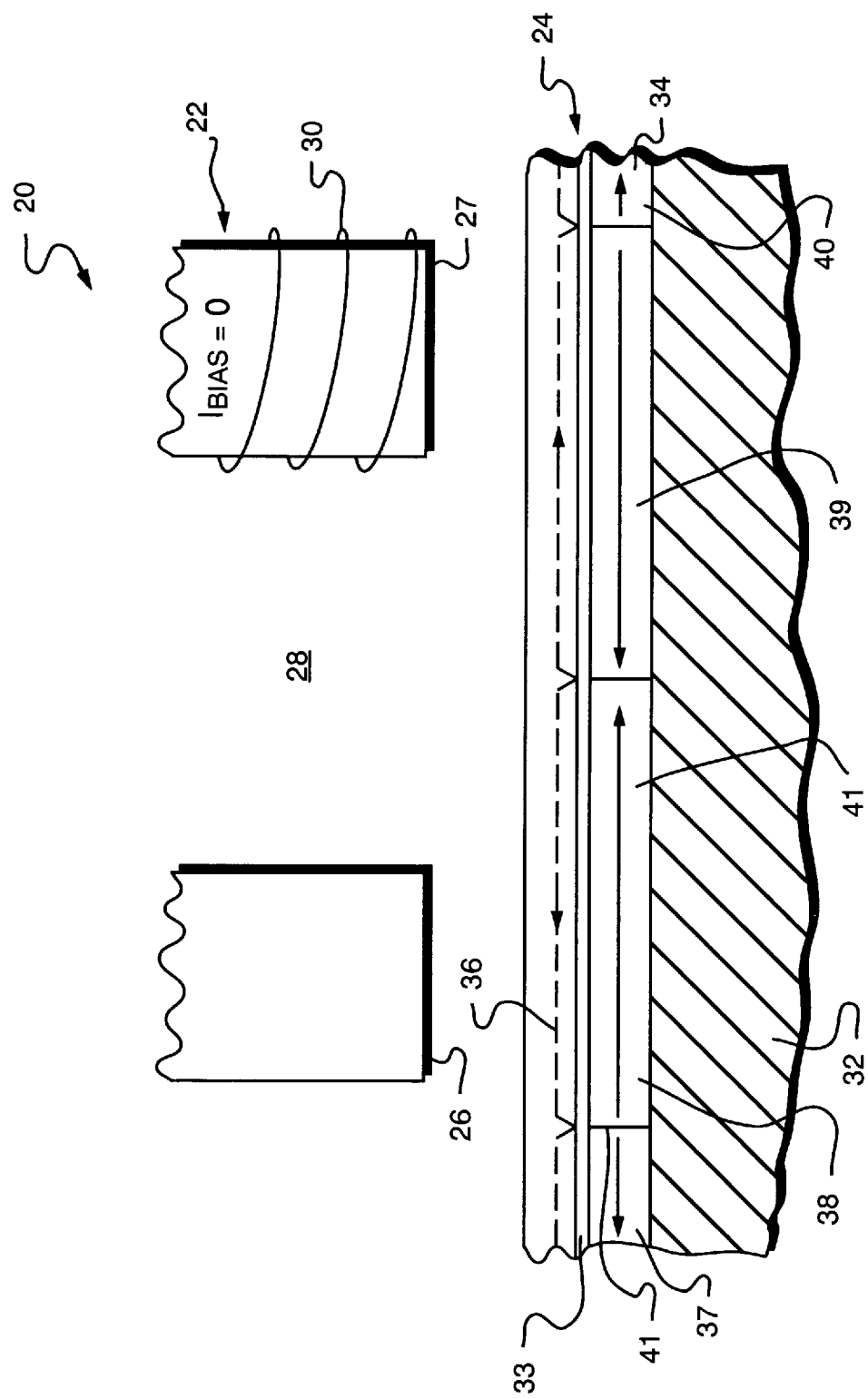
FIG. 1 is a schematic cross sectional illustration of a magnetic storage and reproducing system featuring a keepered magnetic storage medium and a portion of a transducer.

Referring now to FIG. 1, a magnetic storage system 20 is illustrated comprising a magnetic transducer 22 which writes data to and reads data from a magnetic storage medium 24. The transducer 22 comprises poles 26, 27 which form a gap 28, and wherein an electrically conductive winding 30 is disposed about one of the poles. Although the transducer 22 is shown for ease of illustration as a ferrite head, one of ordinary skill will appreciate that other head designs such a thin-film, or a magnetoresistive (MR) head may also be used. Several magnetic storage system embodiments employing an MR head will be discussed in detail herein.

The magnetic storage medium 24 includes a substrate 32, a magnetic storage layer 34 and a low permeability keeper layer 36. The magnetic storage medium 24 may either be a rigid or flexible disk drive, or a tape. The present invention shall be discussed in the context of a rigid disk drive, however, it should be understood that the present invention is also applicable to flexible disk drives and tape. The substrate 32 is a non-magnetic material such as aluminum, plastic or glass. A non-magnetic break layer 33 is positioned between the storage layer 34 and the keeper layer 36. Such a structure has been found to improve the performance of the keeper system.

The magnetic storage layer 34 is segmented into a plurality of record regions 37–40 which define record transitions 41 at their abutting boundaries. Either digital or analog signals may be recorded in the magnetic storage medium in a variety of conventional manners known in the art. In the illustrative embodiment, digital signals are preferably recorded in the magnetic storage layer in longitudinal fashion, wherein, each record region 37–40 is suitable for storing one bit of data. The storage layer 34 is a high coercivity, hard magnetic material, such as an alloy of cobalt, chromium and tantalum. The layer may include magnetic material dispersed within a binder, or it may be a film of high coercivity magnetic material or metal alloy. The layer is preferably chosen to have a longitudinal anisotropy which provides record magnetization which is predominantly longitudinal (i.e., horizontal) to the paper as oriented FIG. 1. The magnetization polarity of each record region 37–40 is represented by horizontal arrows, wherein the arrow direction is indicative of the polarity of the magnetization in each region.

According to the present invention, the magnetic storage medium 24 also includes the low permeability keeper layer 36. The keeper layer 36 is a soft magnetic material of relatively low permeability, which can be saturated by a small bias flux. However, the material does not saturate when the flux from the magnetic storage layer 34 is the only flux acting on the keeper layer (i.e., when the bias flux is not applied). Suitable materials include permalloy, sendust and super sendust.

Figure 2:
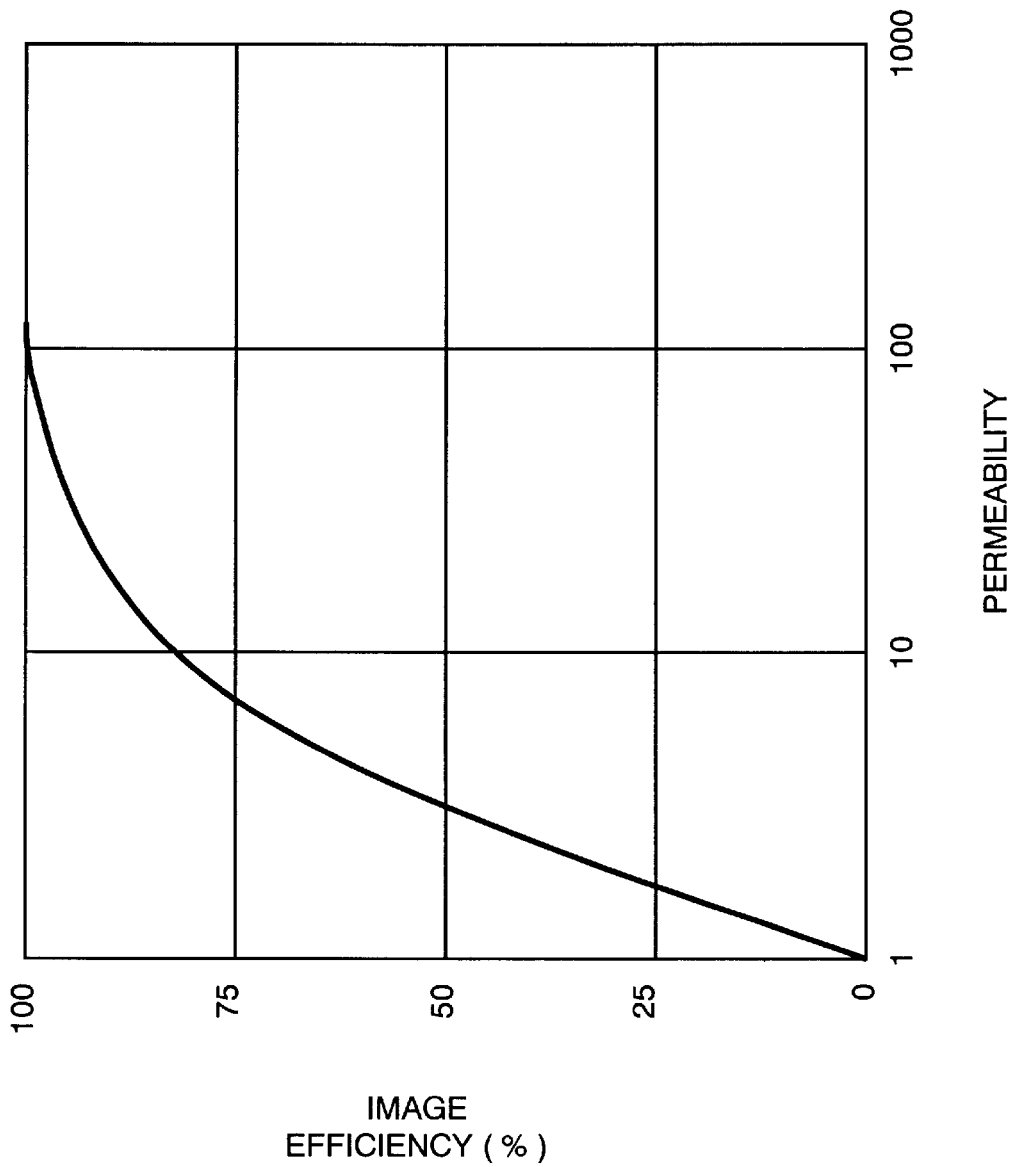
FIG. 2 is a plot of image efficiency versus permeability.

The characteristics of the keeper layer 36 are selected to ensure that in the absence of a bias flux from the winding 30, the layer 36 shunts flux from the record regions 37–39 to create a magnetic image of the regions in the portion of the keeper abutting the record region. FIG. 1 illustrates the case where the bias current $I_{bias}$ through the winding 30 is zero. In this situation, the keeper operates as a shunt, establishing an image in the keeper layer of the magnetization in the record regions. For example, the portion of the keeper layer 36 adjacent to record region 38 conducts flux (shown as a dotted line) which forms an inverse image as compared to the flux permeating through record region 38. The quality of the image (and therefore the effectiveness of the shunt) can be characterized by an image efficiency which is graphically illustrated in FIG. 2 as a function of the keeper layer permeability. The image efficiency is about 75% for a permeability of approximately seven (where permeability of air is one), and it approaches 100% for permeabilities above one-hundred. The image efficiency-indicates the effectiveness of the keeper layer as a shunt. As the image efficiency approaches 100%, the more effective the keeper layer is as a shunt, and therefore, fewer fringing fields emanate from the magnetic storage medium 24. "Low permeability" includes permeabilities of less than about 1000, and preferably the permeability of the keeper layer is less than about 100 in unsaturated portions of the keeper.

Figure 3:
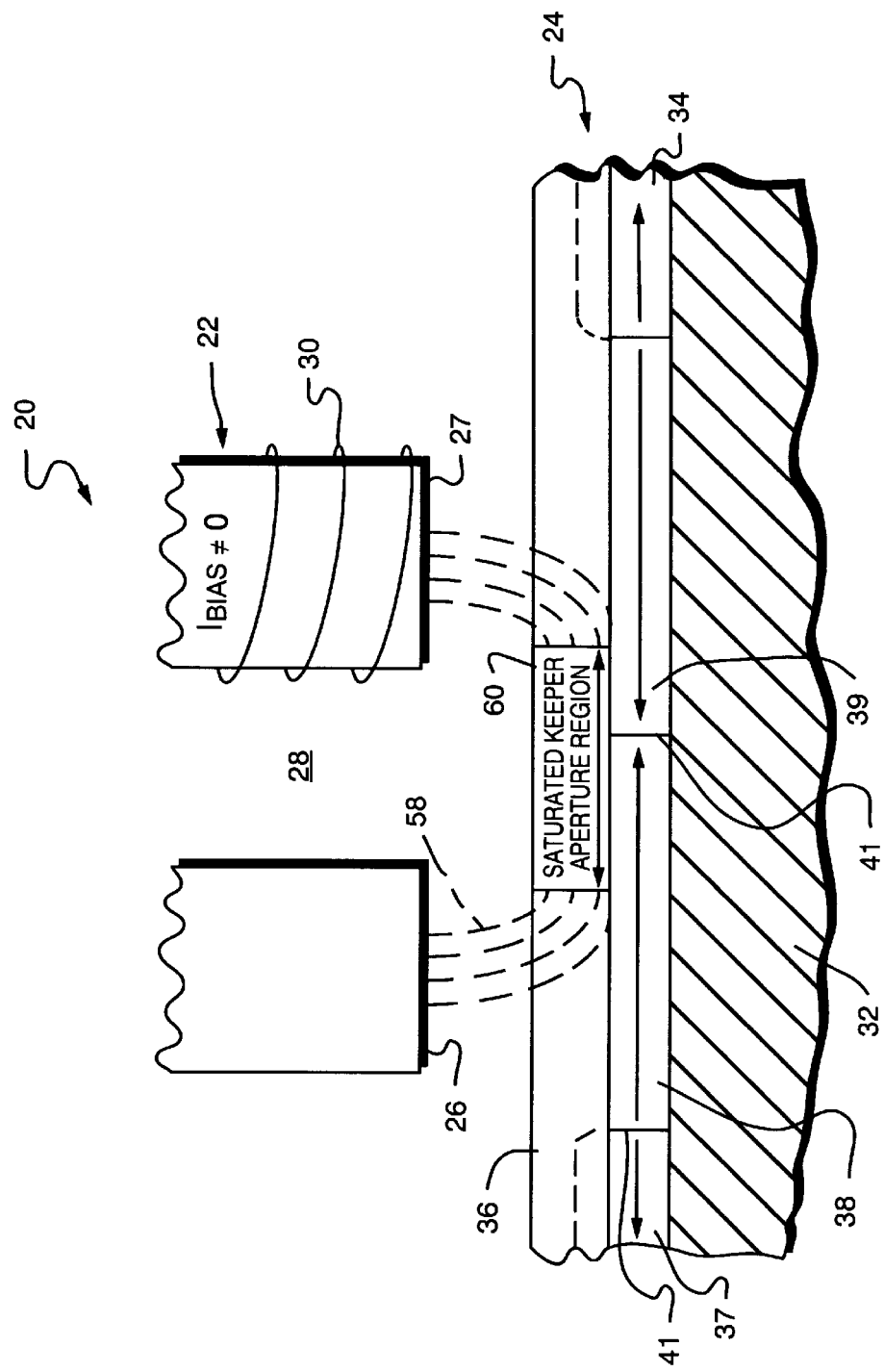
FIG. 3 is a schematic cross sectional illustration of a keepered magnetic storage medium and a portion of a transducer having a non-zero bias current applied to a transducer pole winding which saturates a portion of the keeper to form an aperture region in the keeper.

Referring to FIG. 3, during reproduction operations, a DC bias current is applied to the winding 30 to create a bias flux 58 which permeates and saturates the portion of the keeper layer 36 located between the poles 26, 27, to establish a saturated aperture region 60. Since the aperture region 60 is saturated by the bias flux 58, the shunt path through that portion of the keeper is substantially terminated. Significantly, as the disk is rotated and a record transition 41 is passed "through" the saturated aperture region 60, flux from the record transition 41 fringes out of the aperture region and induces a head output voltage indicative of the data represented by the record transition. The saturated aperture region 60 operates as an aperture, through which flux from the magnetic storage layer 34 is allowed to pass because of the saturated nature of the region 60.

Figure 4:
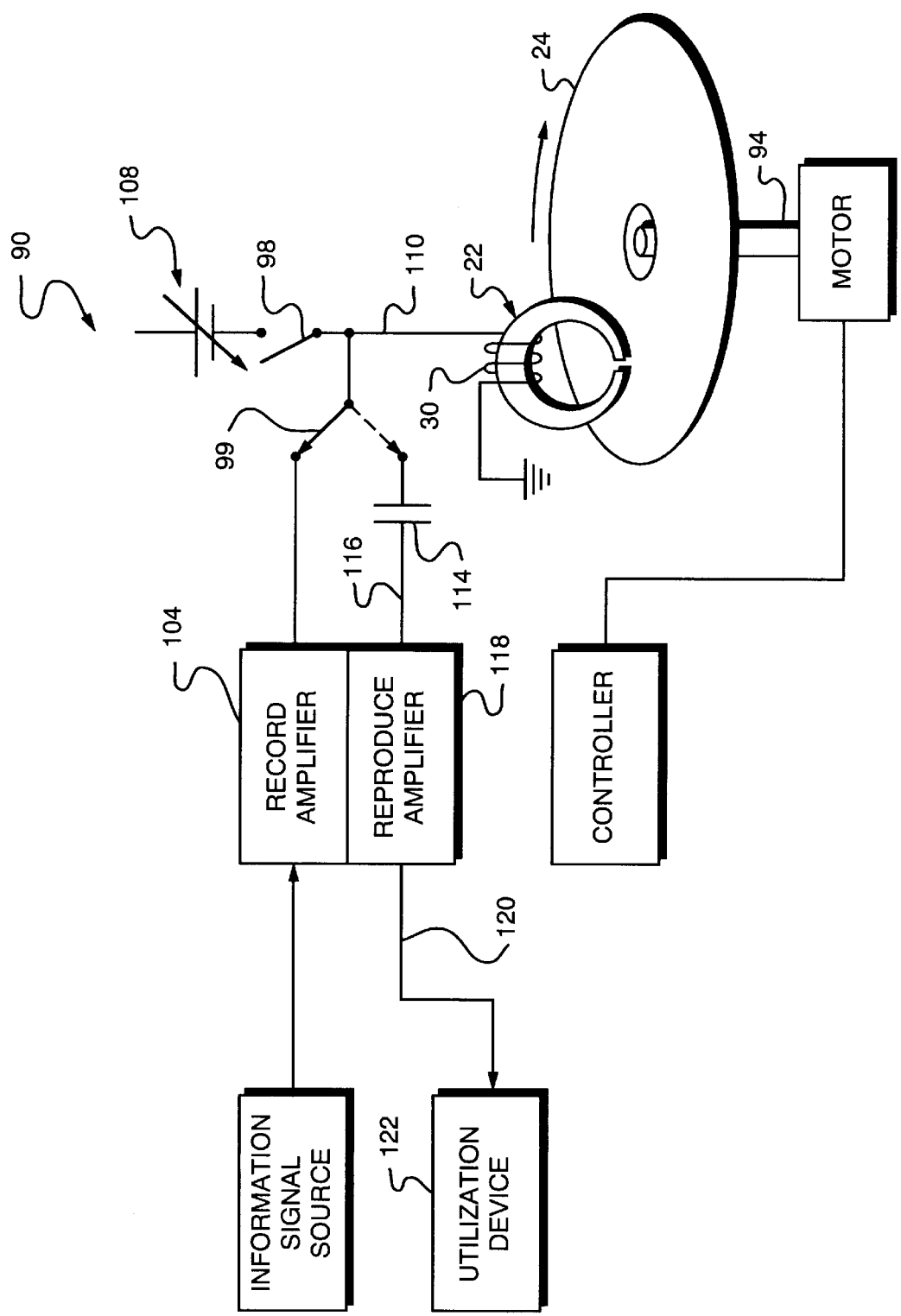
FIG. 4 is a block diagram illustration of a magnetic signal processing system.

FIG. 4 is a block diagram of a signal processing system 90, including the magnetic recording medium 24 comprising a low permeability layer (not shown) according to the present invention. The magnetic recording medium 24, in the form of a rigid disk, is mounted on a motor spindle 94 for rotation beneath the magnetic transducer 22. The transducer 22 includes the winding 30 which conducts input signal currents during record operation modes, and the bias current and output signals during playback operation modes.

In the recording mode, a first switch 98 is open and a second switch 99 is in its first position (indicated by solid lines). These switch positions allow a signal from record amplifier 104 to be applied to the winding 30, to write to the magnetic storage medium 24.

In the reproduction mode, the first switch 98 is closed and the switch 99 is placed in its second position. Closing switch 98 allows an adjustable DC current source 108 to apply a DC bias current on a line 110 to the winding 30. As set forth above with respect to FIG. 3, this bias current, $I_{bias}$, generates a bias flux which saturates a portion of the keeper layer 36 (FIG. 3), to create the saturated aperture region 60 (FIG. 3). The aperture region 60 (FIG. 3) allows flux from the magnetic storage layer to couple to the transducer 22, which induces an output voltage in the windings 30. The output signal is transmitted on a line through switch 99 to a DC filter 114, illustrated as a series capacitor. The capacitor is connected in series to attenuate DC components of the output voltage signal generated by the bias signal. A DC filtered signal is provided on a line 116 to a reproduce amplifier 118 which provides an amplified filtered signal on a line 120 to a utilization device 122.

While the embodiment of FIG. 4 utilizes an electric current to establish the saturated aperture region 60 in the keeper layer, the saturation can be accomplished in other ways. For example, a permanent magnet in proximity to the keeper layer may be employed to interact with the magnetic core of the transducer 22 and affect the localized saturation of the keeper layer needed to form the saturated aperture region. In addition, an AC current source may be employed rather than a DC source. When using an AC bias, it is preferred an AC current source be used providing transitions between biased signal states that are very fast relative to those of the information signals to be transferred relative to the magnetic storage medium. In addition, if a AC bias is used, it may be necessary to replace the capacitor with an AC filter to prevent unwanted bias generated signals from being coupled into the system which reads the induced output voltage signal.

Recent testing by the inventors has unexpectedly determined that the relatively low permeability keeper layer is capable of achieving advantages similar to those disclosed in U.S. Pat. No. 5,041,922 to Wood et al which included one of the co-inventors of the present invention, and is assigned to the assignee of the present invention. As articulately disclosed in Wood et al, the high permeability keeper layer was selected based upon the premise that the keeper layer was required to have a permeability which approximated the permeability of the head poles. Principally, this premise was based upon the belief that the high permeability keeper would effectively operate as an extension of the head poles (although not a physical extension) to reduce spacing losses.

During recent testing of a rigid disk drive system with a keeper layer applied to the magnetic storage layer, the inventors measured the permeability of a keeper layer applied over a magnetic storage layer of a rigid disk. The keeper layer had been deposited onto the magnetic storage layer with the intent of establishing a high permeability keeper. However, measurements indicate that the permeability of the keeper layer was actually much less than the permeability which the inventors believed was required to operate as an effective keeper. Unexpectedly, even with this low permeability keeper, the keepered disk drive still achieved significant performance improvements over non-keepered disk drives.

FIG. 5 illustrates a frequency response plot 140 of test data comparing the amplitude gains for a conventional disk drive system without a keeper layer, and a disk drive system having a low permeability keeper layer as shown in FIGS. 1 and 3. The relative output in decibels (dBs) value is plotted along a vertical axis while recording density is plotted along a horizontal axis. Frequency response values in dB are plotted for a plurality of points along a first line 142 for the conventional non-keepered disk, while the output values in dB for the low permeability keepered media are plotted along a second line 144. As shown, the output levels of the keepered disk are consistently several dB's higher than the output values for the non-keepered media. This is primarily due to the higher flux gradient created by the keeper producing a higher rate of change in the flux of the head.

These test measurements were performed using a rigid disk drive spin stand, available from Teletrack Corporation, and a Sunward metal in gap transducer head. The angular velocity of the disk relative to the head was 575 inches per second. The conventional disk drives include a protective carbon layer approximately 150–170 Angstroms thick located over the magnetic storage layer. The low permeability disks were constructed by depositing a first layer of Chromium from 10–50 Angstroms thick. A second layer of Sendust was then deposited, 75–250 Angstroms thick. A protective carbon layer 150–175 Angstroms thick is then adhered to the Sendust, and then the structure is Tubed in the usual fashion.

It is believed that the improved system output values associated with disk drives employing the relatively low permeability keeper, are primarily because of an effective increase in the flux gradient with the saturated aperture region 60 (FIG. 3). Why the inventors believe this flux gradient is achieved, shall now be briefly discussed.

Figure 6A:
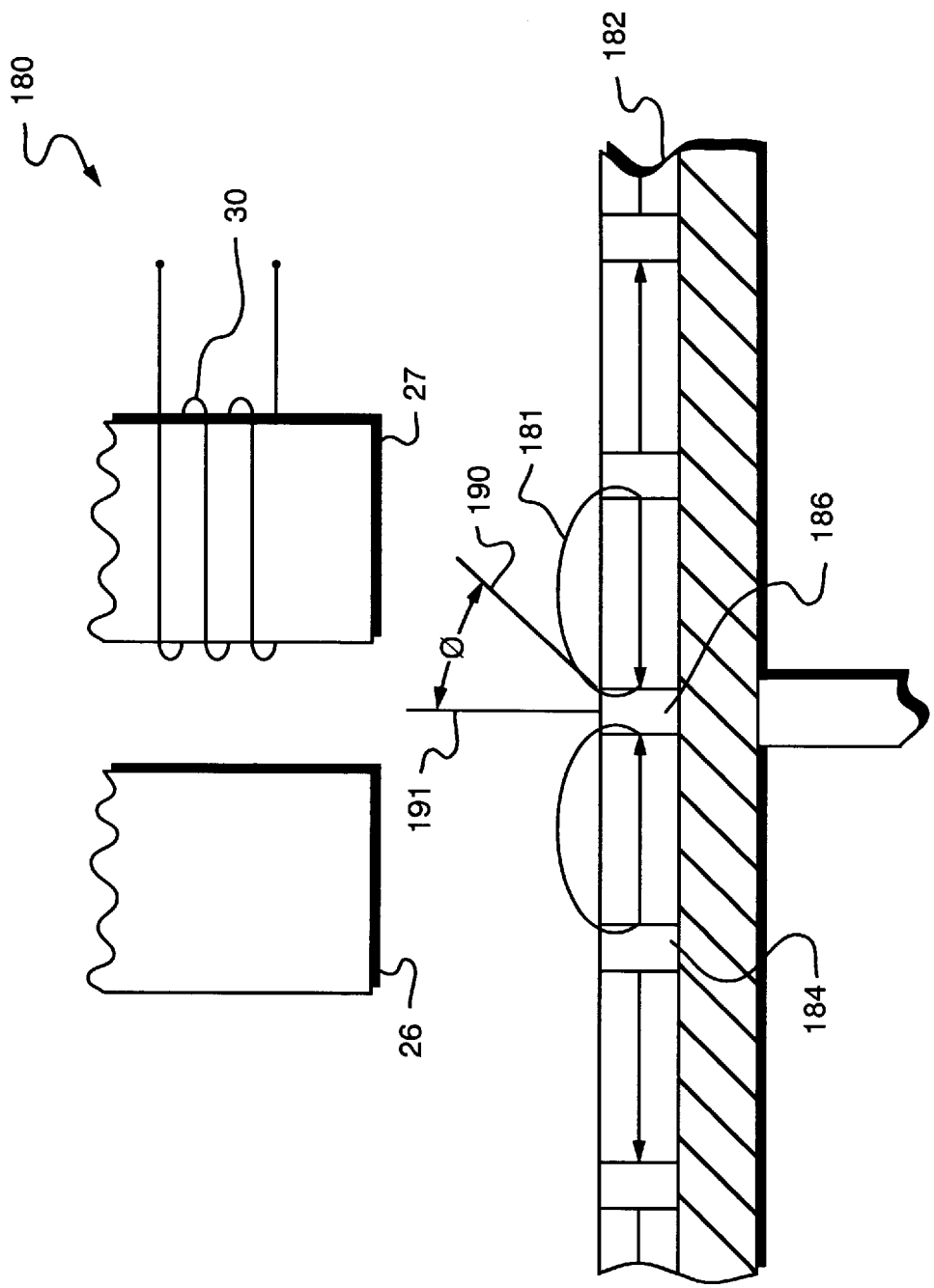
FIG. 6A is an illustration of flux gradient within a cross section of a prior art magnetic storage medium.

FIG. 6A shows a schematic illustration of a prior art nonkeepered media 180 having a magnetic storage layer 182 which includes a plurality of record transitions 184, 186 at the transition region where the remnant magnetization changes polarity. Flux 181 from the recorded transitions is a general field that fringes into the free space around the media. The gradient of this flux 181 from the transition region is represented by an angle φ between line 190 and a line 191 that is perpendicular to the media. The amplitude of head voltage is a function of the steepness of the flux gradient, i.e., the greater the gradient the higher the head output voltage. In conventional unkeepered media, there is a strong demagnetization effect between the recorded bits that exist. This demagnetization smears or defuses the recorded transitions, which in turn effectively reduces the flux gradient resulting in less head output voltage. The effect of demagnetization of the recorded bits becomes greater as the packing density increases.

Figure 6B:
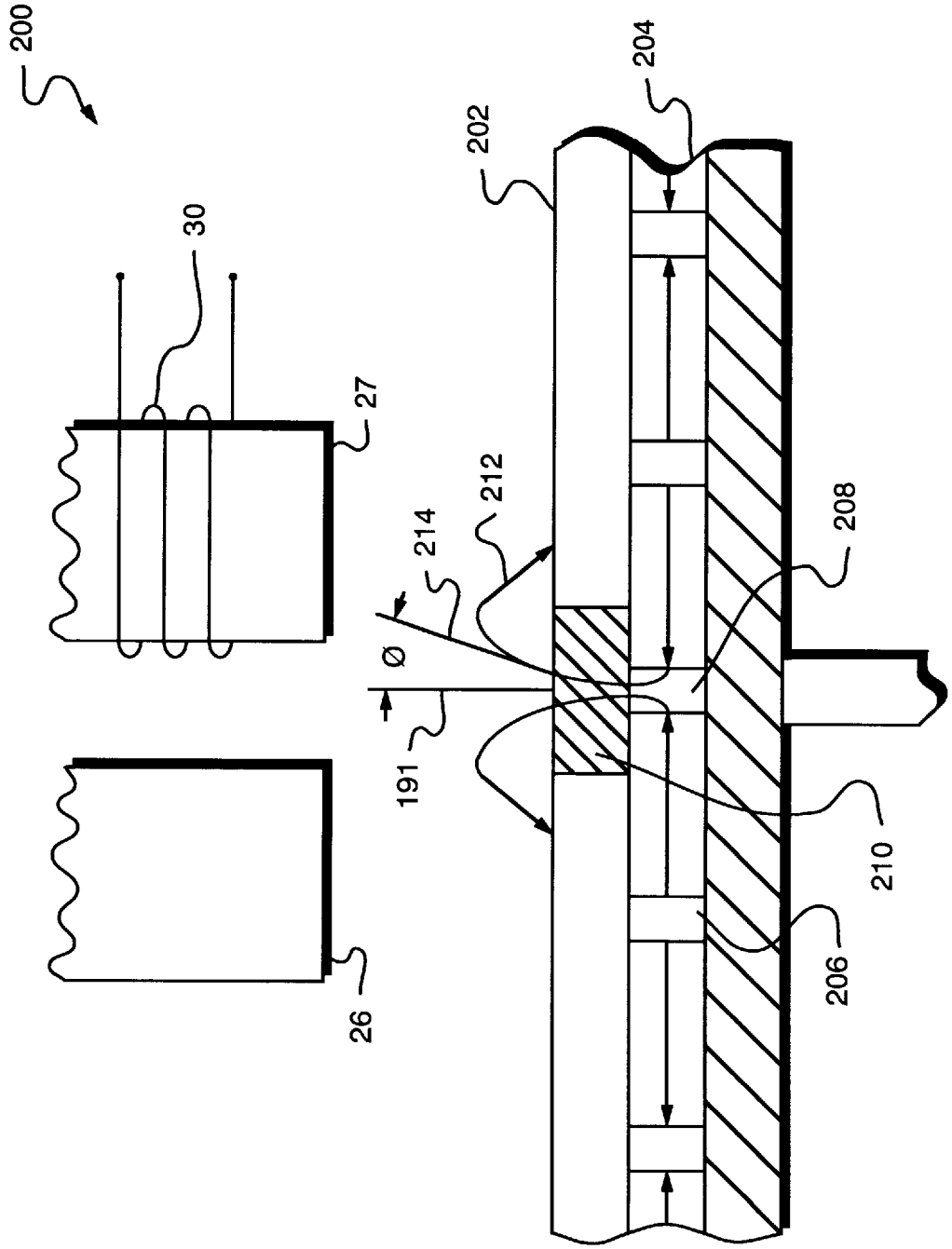
FIG. 6B is an illustration of flux gradient within a cross section of a magnetic storage medium comprising a relatively low permeability keeper layer.

Referring to FIG. 6B which is a schematic view of a magnetic storage system 200 having a low permeability keeper layer 202 and a magnetic storage layer 204, wherein the magnetic storage layer 204 includes a plurality of recorded transitions 206 and 208. During the reproduce mode, the head flying above the keeper establishes a read aperture 210 in the keeper layer. This allows flux 212 from the recorded transition 208 to fringe from the surface of the keeper. Only the flux from one recorded transition at a time can fringe from the read aperture 210. The remaining transitions in the media are shunted by the keeper and produce no fringing flux. This reduces the demagnetization fields in the keepered media and the reproduced transition length. Moreover, the fringing flux is forced to exit through the relatively small read aperture 210, as opposed to the general fringing field around the nonkeepered media. The combined effects of reducing the demagnetization and forcing the fringing flux from the transitions through the read aperture 210 results in sharpening or increasing of flux gradient 214, and in turn reducing the angle φ to produce a higher head output voltage from the keepered over the nonkeepered media.

The keeper layer can be deposited by any suitable deposition technique known in the art, including sputtering. Early test results indicate that a sendust keeper layer having a thickness of about 100 Angstroms provides an improved areal packing density. In general, the keeper layer should be made as thin as possible in order to reduce the recording losses.

The low permeability keeper layer allows the head flying above the magnetic storage medium to operate independent from the keeper, and during the reproduction mode, the head only acts to bias the keeper and as a flux detector.

Figure 7:
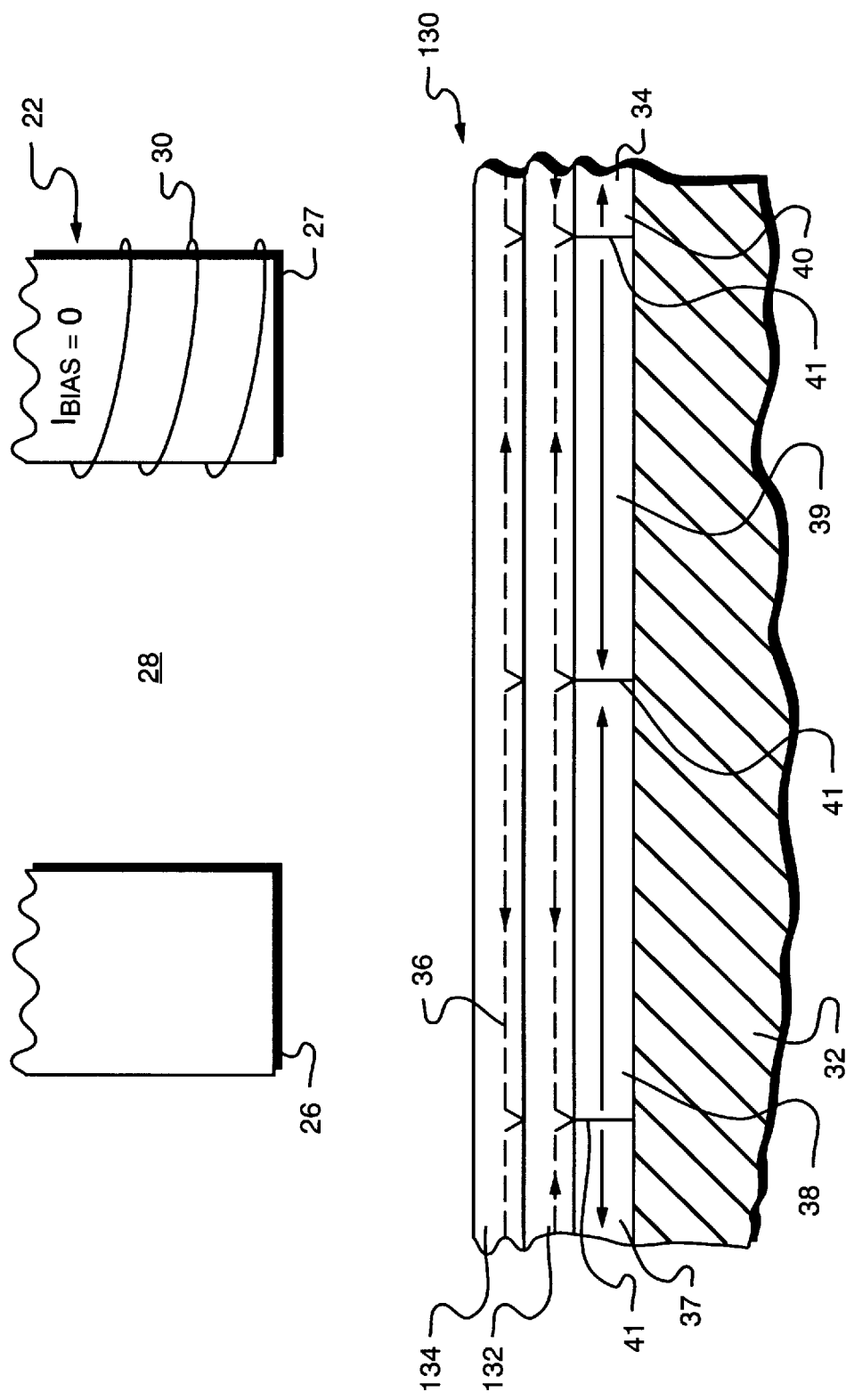
FIG. 7 illustrates a cross sectional illustration of an alternative embodiment keepered magnetic storage medium comprising two keeper layers 132, 134.

FIG. 7 illustrates a cross sectional illustration of an alternative embodiment keepered magnetic storage medium 130 comprising two (2) keeper layers 132, 134. In this embodiment, the first keeper layer 132 is selected to only partially shunt the flux from the recorded transitions 41 on the magnetic storage layer 34. Since the keeper fields are of opposite polarity compared to the magnetic storage layer, the keeper layers in the two layer system concentrate the flux in each layer. This reduces variations due to transition polarity and results in less asymmetry of the output voltage induced in the head, for signals recorded on the disk of opposite polarity.

Figure 8:
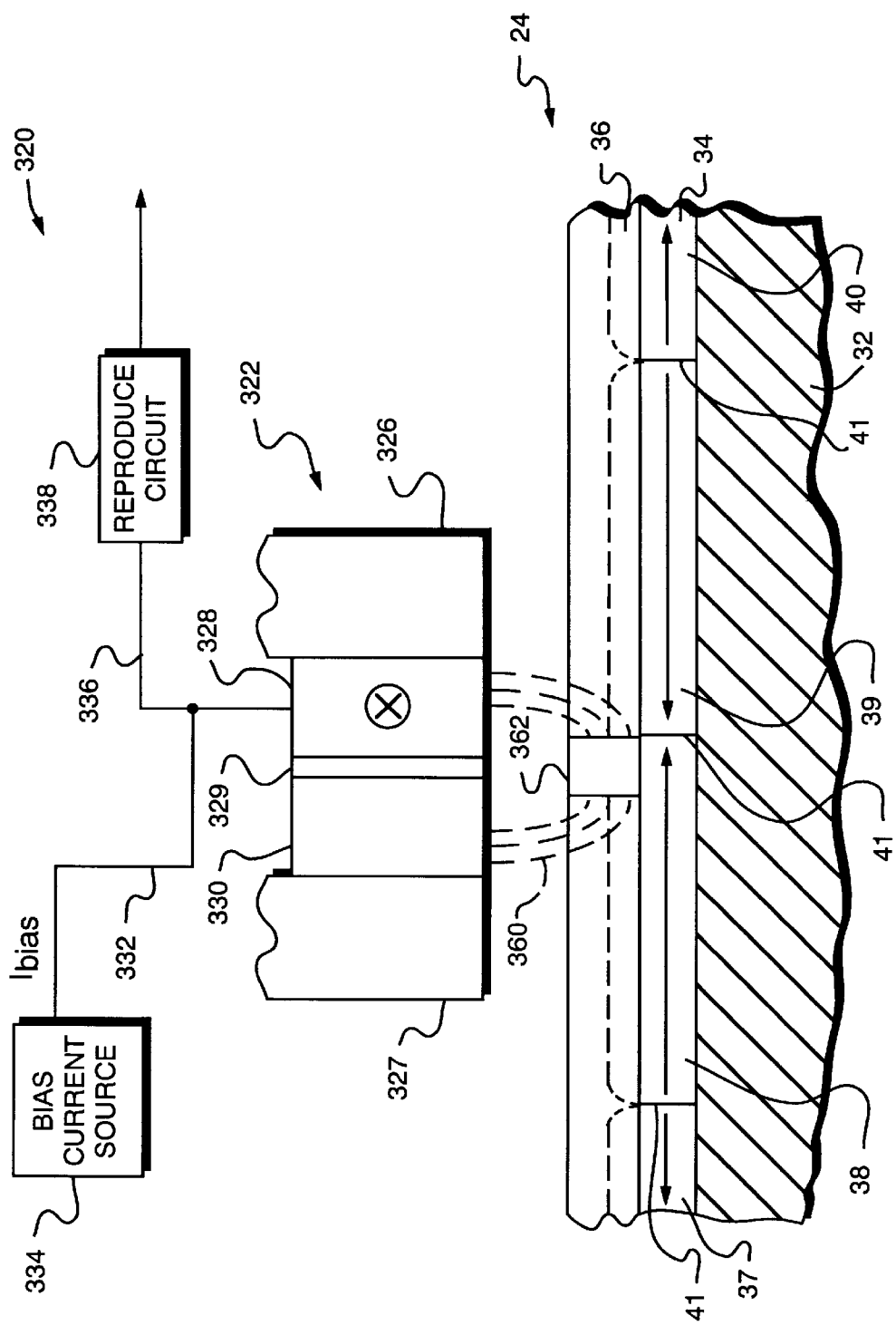
FIG. 8 is a schematic cross sectional illustration of a magnetic storage and reproduce system comprising an MR sensor.

FIG. 8 illustrates another alternative embodiment including a magnetic storage and reproduce system 320 comprising a magnetic transducer 322 which reads data from the magnetic storage medium 24. The transducer 322 comprises shields 326, 327 of nonmagnetic material, a magnetoresistive (MR) flux sensing element 328, a non-conductive layer 329 (e.g., ceramic material or glass), and soft adjacent layer 330. The MR element is an electrical conductor which receives a bias current signal $I_{bias}$ on a line 332 from a bias current source 334 to bias the MR element to operate about its linear sensing region. The MR element provides an electrical signal on a line 336 which is input to a reproduce circuit 338 and output to a utilization device (not shown).

When the bias current $I_{bias}$ applied to the bias element 328 is zero, the keeper 36 operates as a shunt, establishing an image in the keeper layer of the magnetization in the record regions 37–40. During reproduction operations the bias current source 334 applies a DC bias current to the MR element 328 to create a bias flux 360 which permeates and saturates a portion of the keeper layer, to establish to a saturated aperture region 362. Since the aperture region 362 is saturated by the bias flux 360, the shunt path through that portion of the keeper is substantially terminated. It should be noted that the same bias current for the MR element is also used to bias the keeper. Significantly, as the disk is rotated and a record transition 41 is passed "through" the saturated aperture region 360, flux from the record transition 41 fringes out of the aperture region and induces a head output voltage indicative of the data represented by the record transition. As discussed above, the saturated aperture region 362 operates as an aperture, through which flux from the magnetic storage layer 34 is allowed to pass because of the saturated nature of the region 362. The bias flux 360 also biases the M element 328 to operate the element in its linear sensing region.

While the embodiment of FIG. 8 utilizes an electric current to establish the saturated aperture region 362 in the keeper layer, the saturation can be accomplished in other ways. For example, a permanent magnet in proximity to the MR element 328 and the keeper layer may be employed to affect the localized saturation of the keeper layer needed to form the saturated aperture region 362 and properly bias the MR element. Other suitable MR head bias techniques include generating the bias flux with a separate hard or soft layer, barber pole conductors or by employing adjacent paired sensors. In general, each bias technique must be capable of properly biasing the M element and saturating a portion of the keeper to establish the aperture region 362.

As previously mentioned the improved system output values associated with disk drives employing the relatively low permeability keeper, are primarily because of an effective increase in the flux gradient with the saturated aperture region 62 (FIG. 1). This also increases the magnitude of the flux coupling to the MR element, and therefore the electrical output of the MR element.

Figure 9:
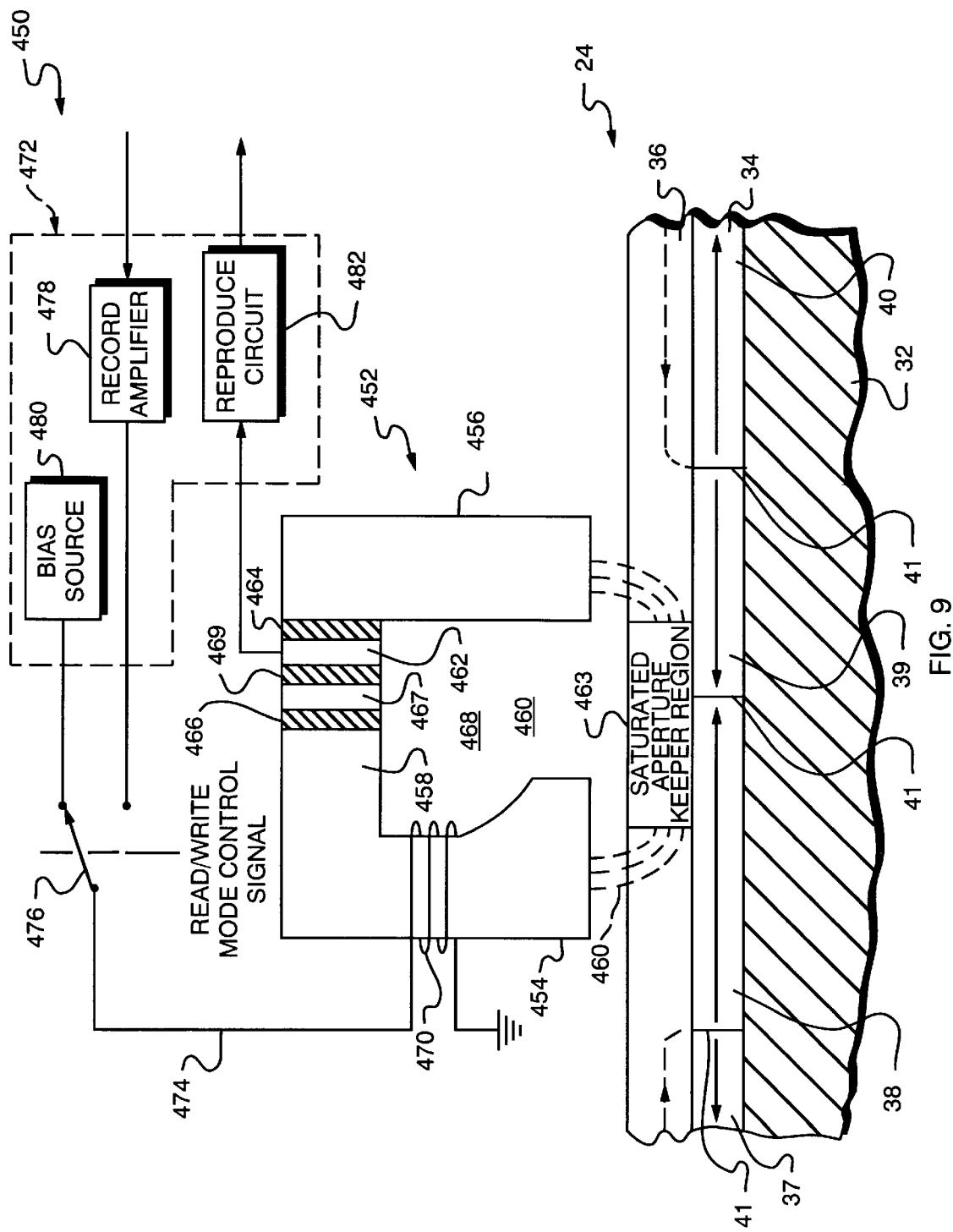
FIG. 9 is a schematic perspective illustration of the transducer and reproduce circuit of FIG. 8.

FIG. 9 illustrates an alternative embodiment magnetic storage system 450 which includes a modified MR head 452. The modified MR head 452 comprising poles 454, 456, respectively, disposed in spaced relationship between a supporting bridge 458 to form gap 460. These major portions of the core of the head are preferably fabricated of ferrite. In the embodiment illustrated, the bridge 458 further includes an MR sensing element 462 generally sandwiched between nonmagnetic, isolation spacers 464, 466. The spacers can be glass or aluminum, for example. In addition, a soft magnetic adjacent layer 467 (SAL) is provided on one side of the sensing element 462, inside the spacers. Layer 467 is separated from the MR sensing element by a nonmagnetic isolation spacer 469. All these layers can be assembled by conventional processing steps that are well known.

The head can be constructed from ferrite using a metal in gap type structure, or can be constructed using thin film techniques. To maximize head efficiency a small winding window 468 is provided in the head, and a short magnetic path is used.

A coil 470 is provided through the winding window in the embodiment illustrated. It should be recognized that if thin film techniques are used to fabricate the head, a thin film coil can be fabricated along with the head. In a ferrite version, a separate conductive wire of appropriate dimension is utilized. In either instance, coil 470 is adapted to be connected to a write-record circuit 472 by a conductor 474. With the system operating in the record mode, the coil is connected through a switch 476 to a record amplifier 478, and the head functions like a conventional inductive head.

Specifically, the record amplifier 478 provides a recording signal to the coil 470 to generate a record field that is sufficient to saturate a portion of the keeper layer 36 in a region beneath the head gap 460. When the keeper is saturated by the record field, the permeability of the saturated region drops and the record flux from the head passes through the unsaturated portions on either side of the saturated region to the storage layer 34 beneath the keeper 36.

In the reproduce mode, coil 470 is connected via switch 476 to a bias source 480. A small DC, or AC, bias signal is then applied to the head coil 470 to create a bias flux in the head gap sufficient to saturate the region 462 of the keeper layer directly beneath the head gap. This again reduces the permeability of the keeper and allows flux from the record transition 41 directly beneath the saturated aperture region 462 to reach the head 452. This signal flux is then guided through the poles 454, 456 to the MR sensor 462 where the resistivity of the sensor changes as a result of the flux magnitude in well known fashion.

In addition to the keeper bias, the MR sensing element 462 requires an additional bias flux in the reproduce mode to linearize its output signal. In the embodiment illustrated, this bias is provided by soft adjacent layer 467 adjacent to the MR element. The sense current in the MR sensor 462 induces fields in the soft adjacent layer 467 which are coupled back to the MR sensor. The flux from the induced fields bias the MR sensor so it operates in its linear sensing region for high sensitivity flux detection.

Figure 10:
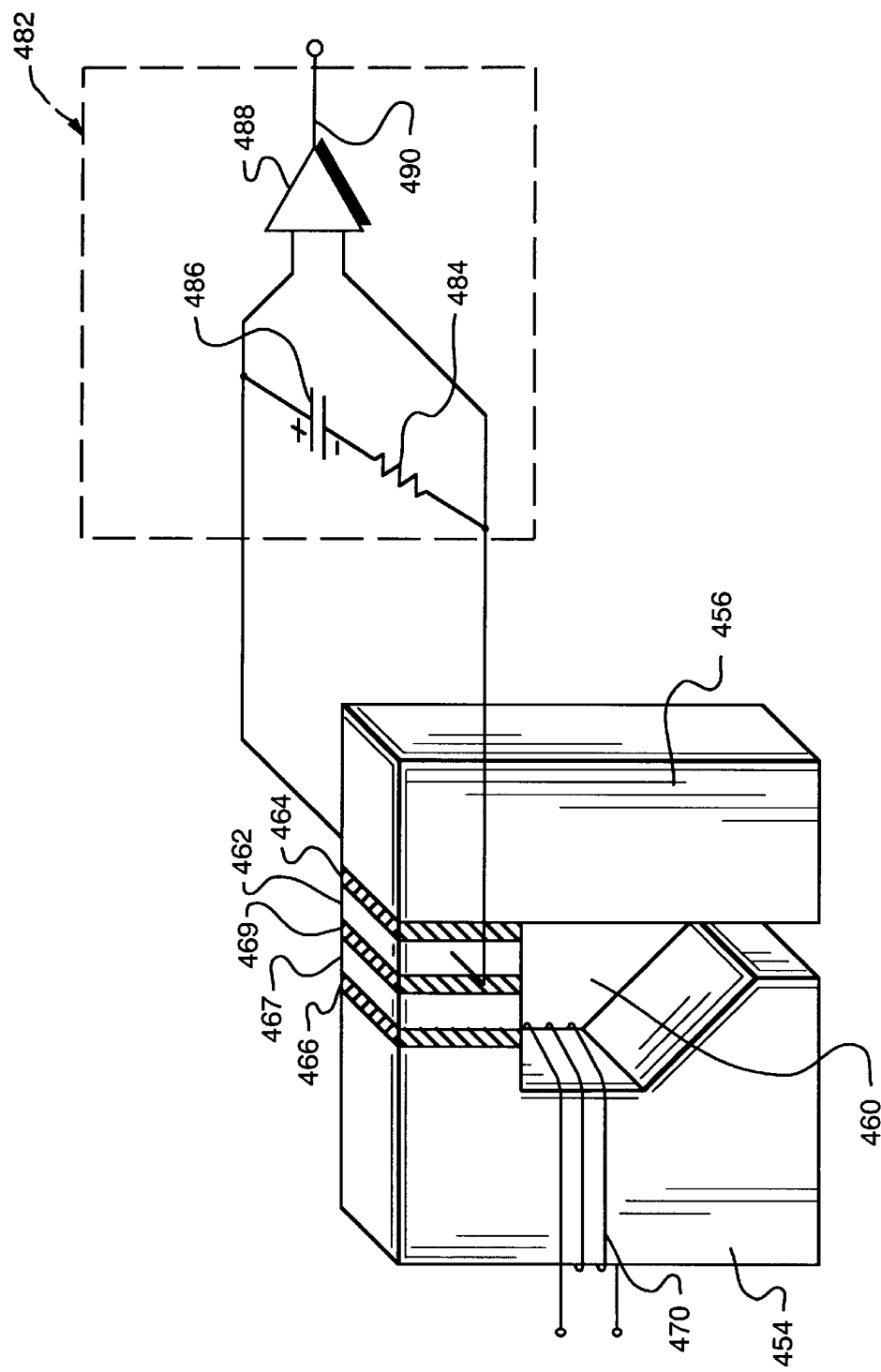
FIG. 10 is a schematic cross sectional illustration of an alternative embodiment magnetic storage and reproduce system comprising an MR sensor within the yoke region an inductive head.

As shown in detail in FIG. 10, the MR sensor is connected to the reproduce circuit 482 which comprises a resistor 484 and a sense current source 486. Advantageously, a small change in the resistivity of the MR sensor 462 will result in a voltage change across the resistor 484 that is sufficient to identify the presence of a recorded bit in the storage layer 34 (FIG. 9). This voltage change is amplified by a reproduce preamplifier 488 which provides a high sensitivity MR detection signal on a line 490 to a utilization device (not shown).

Figure 11:
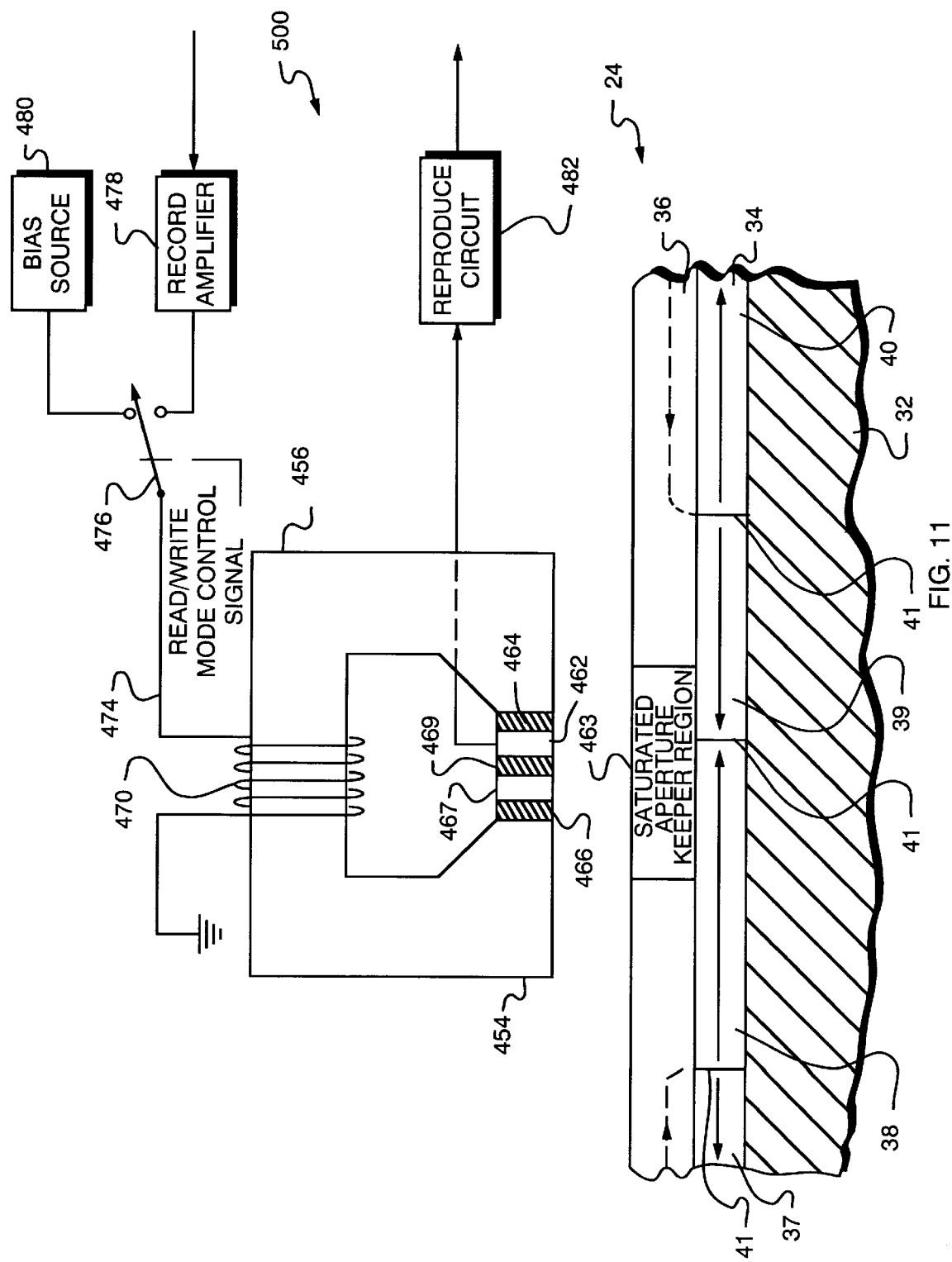
FIG. 11 is a schematic cross sectional illustration of another alternative embodiment system comprising an MR sensor embodied within a gap region of an inductive head.

FIG. 11 illustrates yet another alternative embodiment magnetic storage and reproducing system 500. This system is substantially similar to the system illustrated in FIG. 9, with the exception that the MR sensor is located in the gap region of the inductive head.

The MR sensing element incorporated within a modified MR sensor head core as illustrated herein provides a number of advantages in conjunction with keepered media storage systems. Since the output voltage of the MR sensor is a function only of the amplitude of the recorded flux (rather than the rate of change of the recorded flux), larger output voltages can be obtained from the sensor as compared to an inductive head. This results in the improved signal to noise characteristics that are necessary for higher recording density. The improved signal to noise characteristics of the MR sensor are particularly well suited for use with a system such as the keepered media system described herein that has greatly reduced spacing loss.

It should be apparent that the modified MR embodiments described herein are arranged for carrying out both read and write functions through the same head structure. However, it should also be recognized that the sensing arrangement described herein could be used solely for the purpose of sensing or read operations.

It should also be readily understood that other coats and overcoats may be used along with the disclosed layers in the practice of the present invention. For example, a non-magnetic layer (not shown) can be disposed on the magnetic storage layer to interrupt effects of magnetic exchange coupling between the keeper layer and the magnetic storage layer, allowing these layers to react separately to magnetic flux and allowing the keeper layer to shunt the flux from the storage layer. The materials for this non-magnetic layer may include chromium, carbon or silicon. An example of a magnetic storage media arrangement disclosing such a non-magnetic layer is International Patent Application No. WO 93/12928, published Jul. 8, 1993, and entitled *"Magnetic Recording Media Employing Soft Magnetic Material"*, which is hereby incorporated by reference. In the two keeper embodiment illustrated in FIG. 7, this thin non-magnetic layer can also be located between the first and second keeper layers.

Although the present invention has been shown and described with respect to preferred embodiments thereof, it should be understood by those skilled in the art that various other changes, omissions and additions to the form and detail thereof may be made therein without departing from the spirit and scope of the invention.

What is claimed is:

1. A magnetic recording medium, comprising:
    a substrate;
    a magnetically coercive material disposed on said substrate for storing magnetic signals; and
    a magnetically permeable, magnetically saturable material disposed on said magnetically coercive material, wherein said magnetically saturable material has a low permeability when said magnetically saturable material is unsaturated.

2. The magnetic recording medium of claim 1, wherein said magnetically saturable material has a DC permeability of less than 1000 when said material is unsaturated.

3. The magnetic recording medium of claim 1, wherein said magnetically saturable material has a DC permeability between five and one-hundred when said material is unsaturated.

4. The magnetic recording medium of claim 1, wherein said magnetically coercive material is disposed between said substrate and said magnetically saturable material.

5. A magnetic recording medium for use in a recording/reproducing system of the type in which a bias flux is applied to the recording medium to define a signal transfer zone, comprising:
    a non-magnetic substrate;
    a magnetically coercive layer whose magnetization is controlled to store magnetic signals; and
    a layer of magnetic material having a low permeability when unsaturated and a thickness such that a portion of said layer of low permeability material becomes saturated by an applied bias flux whose magnitude is less than that required to alter the magnetization of said coercive layer, wherein the applied bias flux establishes the signal transfer zone.

6. A magnetic recording medium for use in a recording/reproducing system in which magnetic information is transferred between a transducer and the record medium, comprising:
    a non-magnetic substrate;
    a layer of magnetically coercive material in which the magnetic information is stored; and
    a magnetic material having a low permeability when unsaturated and disposed on the substrate in a manner such that said low permeability material becomes selectively saturated during the transfer of information between the transducer and said layer of magnetically coercive material, whereby flux from one recorded transition is coupled to the head during a read operation.

7. The magnetic recording medium of claim 6 wherein said low permeability magnetic material is disposed in a discrete layer that is contiguous with said magnetically coercive layer.

8. The magnetic recording medium of claim 6 wherein the thickness of said layer of low permeability magnetic material is such that a portion of said layer becomes saturated by a flux whose magnitude is less than that required to alter the magnetization of said coercive layer.

9. A magnetic recording medium comprising:
    a substrate;

a magnetically coercive storage material;

a magnetically permeable and saturable material disposed proximate to said material, wherein said magnetically saturable material has a low permeability when said magnetically saturable material is unsaturated, and when saturated has a sensing aperture formed therein that increases the gradient of transferred flux during a sensing mode of the medium.

10. A magnetic recording medium comprising:

a non-magnetic substrate;

a first layer of magnetic material for storing magnetically defined information therein; and a second layer of magnetic material having a low permeability when unsaturated and a thickness relative to said first layer such that the magnitude of magnetic flux required to saturate said second layer is less than the magnitude required to alter information stored in said first layer, wherein said second layer can be selectively saturated to form an aperture therein during transfer of information from said first layer that increases the gradient of transferred flux.

11. A magnetic storage medium supported by a substrate comprising:

a magnetically coercive layer for storing magnetic flux representing electrical signals; and a magnetically permeable, magnetically saturable layer disposed in magnetic relationship to said magnetically coercive layer, said magnetically saturable layer having a low permeability when unsaturated to facilitate its shunting characteristic with respect to stored flux, and when saturated to facilitate the formation of a sensing aperture therein that increases the gradient of transferred flux during a flux sensing mode of the medium.

* * * * *